US006952755B2

(12) United States Patent
Karube

(10) Patent No.: US 6,952,755 B2
(45) Date of Patent: Oct. 4, 2005

(54) CONTROL DEVICE FOR FILE RESOURCES IN A NETWORK

(75) Inventor: Fumiyoshi Karube, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 320 days.

(21) Appl. No.: 10/271,717

(22) Filed: Oct. 17, 2002

(65) Prior Publication Data

US 2003/0149850 A1 Aug. 7, 2003

(30) Foreign Application Priority Data

Feb. 7, 2002 (JP) ........................................ 2002-030728

(51) Int. Cl.⁷ ........................... G06F 13/14; G06F 12/00
(52) U.S. Cl. ........................... 711/150; 707/8; 711/147; 711/152
(58) Field of Search .................. 707/2, 8, 9; 711/147, 711/150, 152, 163

(56) References Cited

U.S. PATENT DOCUMENTS

| 5,734,909 A | * | 3/1998 | Bennett | ...................... 710/200 |
| 6,542,891 B1 | * | 4/2003 | Loen et al. | ...................... 707/8 |
| 6,782,440 B2 | * | 8/2004 | Miller | ...................... 710/200 |

FOREIGN PATENT DOCUMENTS

| WO | WO 99/30254 | 6/1999 |
| WO | WO 01/52079 | 7/2001 |

OTHER PUBLICATIONS

G. Colouris, J. Dollimore, T. Kindberg: "Distributed Systems Concepts and Design", 2001, Addison Wesley, Essex, England pp. 482–494.

Gibson, G., et al., "Filesystems for Network–Attached Secure Disks", CMU SCS Technical Report CMU–CS–97–118, vol. 97, No. 118, 1997, pp. 1–18.

Carter, J. et al., "Khazana: An Infrastructure for Building Distributed Services" May 26, 1998, Distributed Computing Systems, 1998, 18th International Conference on Amsterdam, Netherlands May 26–29, May 1998, pp. 562–571.

Communication including European Search Report from the European Patent Office dated Jul. 6, 2004 in the corresponding European patent application.

* cited by examiner

Primary Examiner—Gary Portka
(74) Attorney, Agent, or Firm—Staas & Halsey LLP

(57) ABSTRACT

A file control device receives access requests from an application requesting the exclusion of file resources and an application requesting no such exclusion through a network and also accepts an access request from an application inside the device. Exclusive control over the file resources is automatically performed among the access requests.

9 Claims, 22 Drawing Sheets

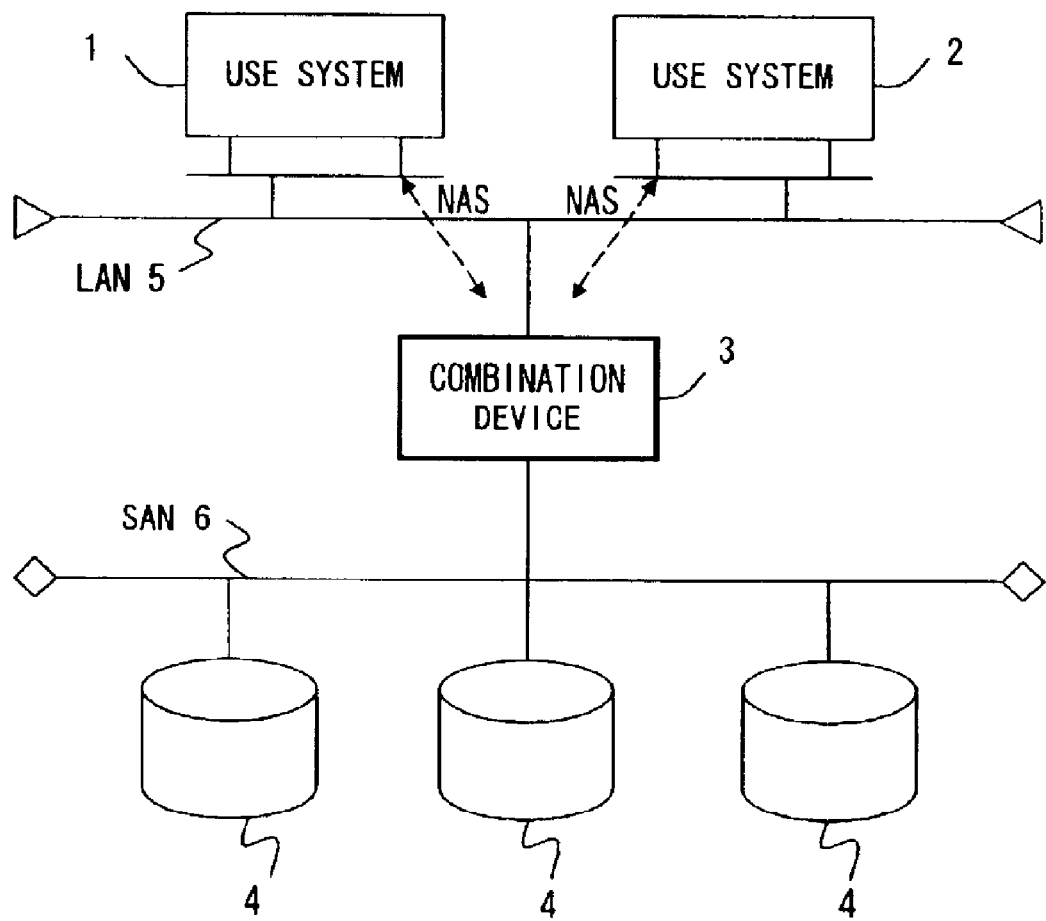
F I G. 1

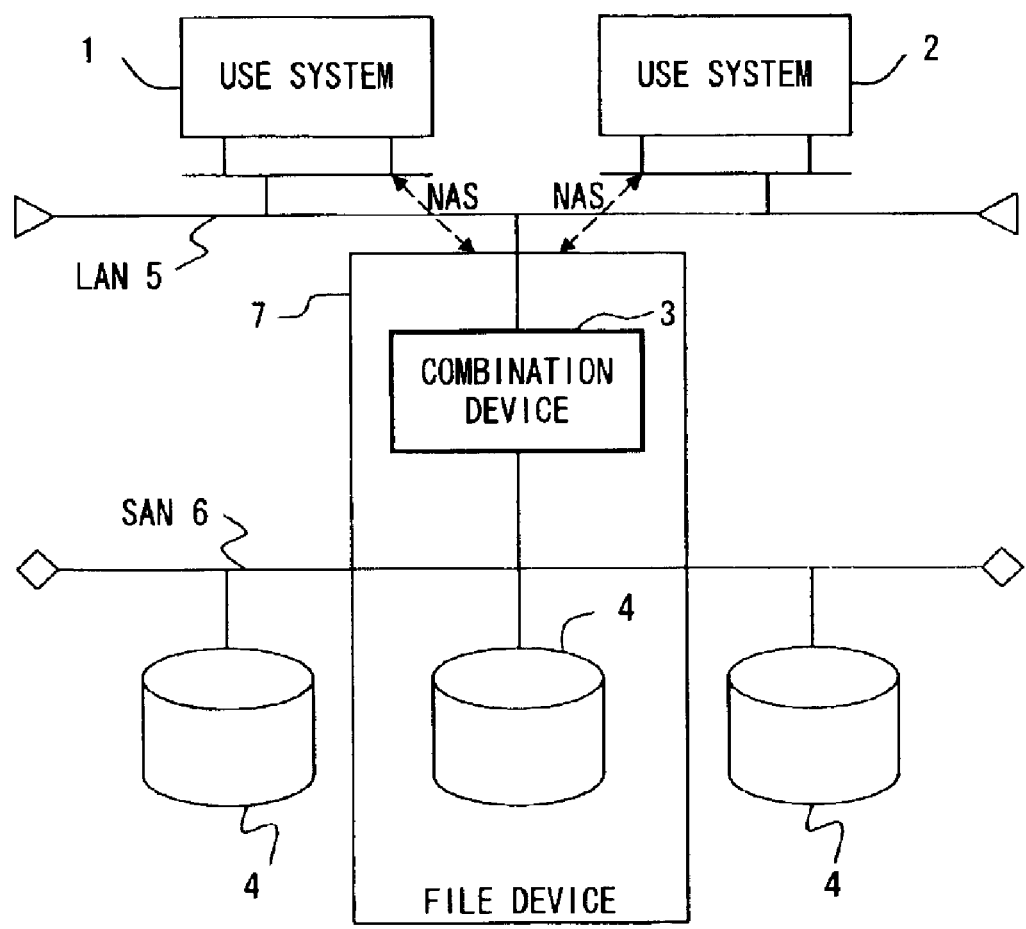
F I G. 2

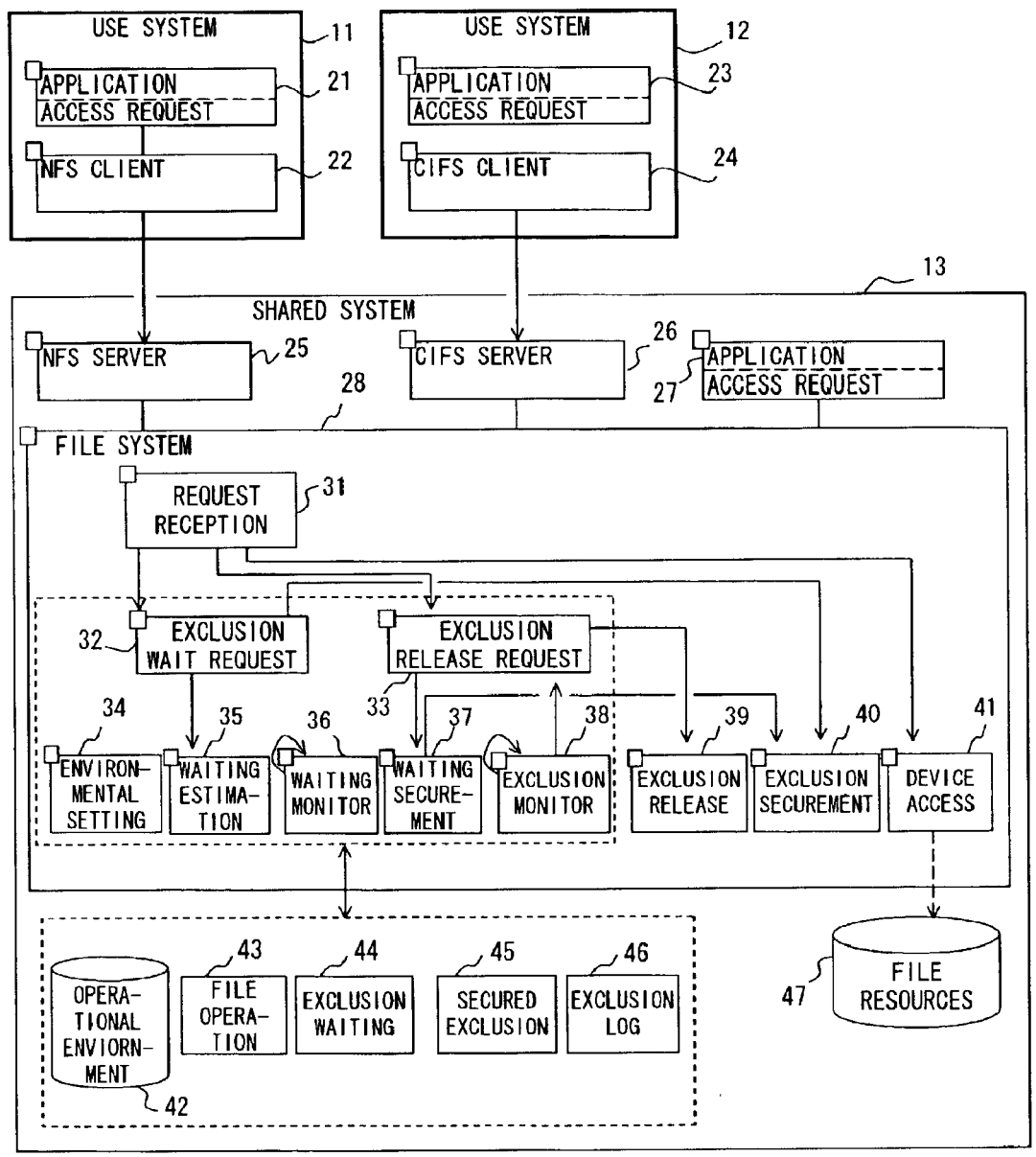
F I G. 3

| FILE OPERATION | | | EXCLUSION | | | |
|---|---|---|---|---|---|---|
| COMMAND | MODE | | SECUREMENT | RELEASE | RANGE | MODE |
| open | input | | YES/NO | YES/NO | ENTIRE file | read/write |
| | output | | YES/NO | YES/NO | ENTIRE file | write |
| | extend | | YES/NO | YES/NO | LATTER PART OF A file | write |
| | OTHERS | | YES/NO | YES/NO | — | — |
| close | | | — | | — | — |
| read | | | YES/NO | YES/NO | ENTIRE file or READING RANGE | read/write |
| write | | | YES/NO | YES/NO | ENTIRE file or WRITING RANGE | write |
| OTHERS | | | YES/NO | YES/NO | — | — |

F I G. 4

| REQUESTED EXCLUSION | ALREADY SECURED EXCLSION | ENVIRONMENTAL SETTING OF EXCLUSION | REMARKS |
|---|---|---|---|
| read | read | NORMAL | READING COMPETITION IS ALLOWED |
| | | ABNORMAL | NO READING COMPETITION IS ALLOWED |
| | write | NORMAL | READING IS ALLOWED EVEN DURING WRITING (read-only) |
| | | ABNORMAL | NO READING IS ALLOWED DURING WRITING |
| write | read | NORMAL | WRITING IS ALLOWED EVEN DURING READING (IN THE SAME STATUS AS NO EXCLUSION) |
| | | ABNORMAL | NO WRITING IS ALLOWED DURING READING |
| | write | NORMAL | WRITING IS ALLOWED EVEN DURING WRITING (IN THE SAME STATUS AS NO EXCLUSION) |
| | | ABNORMAL | NO WRITING IS ALLOWED DURING WRITING |

FIG. 5

| STATUS OF EXCLUSION | NOTIFICATION METHOD TO APPLICATION | NOTIFICATION CODE |
|---|---|---|
| EXCLUSION CAN BE NORMALLY SECURED | NORMAL | 0 |
| EXCLUSION CANNOT BE SECURED SINCE ANOTHER APPLICATION HAS EXCLUSION | THERE ARE THE FOLLOWING CHOICES<br>· REPORTS AN ERROR<br>· REPORTS AN ERROR AFTER A SPECIFIC TIME PERIOD<br>· WAITS UNTIL EXCLUSION IS SECURED | · DESIGNATES IN AN ENVIRONMENTAL SETTING<br>· DESIGNATES IN AN ENVIRONMENTAL SETTING<br>· 0 AFTER EXCLUSION IS SECURED |
| A SERVER MAKES CANCEL DURING EXCLUSION WAITING | REPORTS AN ERROR | DESIGNATES IN AN ENVIRONMENTAL SETTING |
| OTHER ERRORS | REPORTS AN ERROR | DESIGNATES IN AN ENVIRONMENTAL SETTING |

F I G. 6

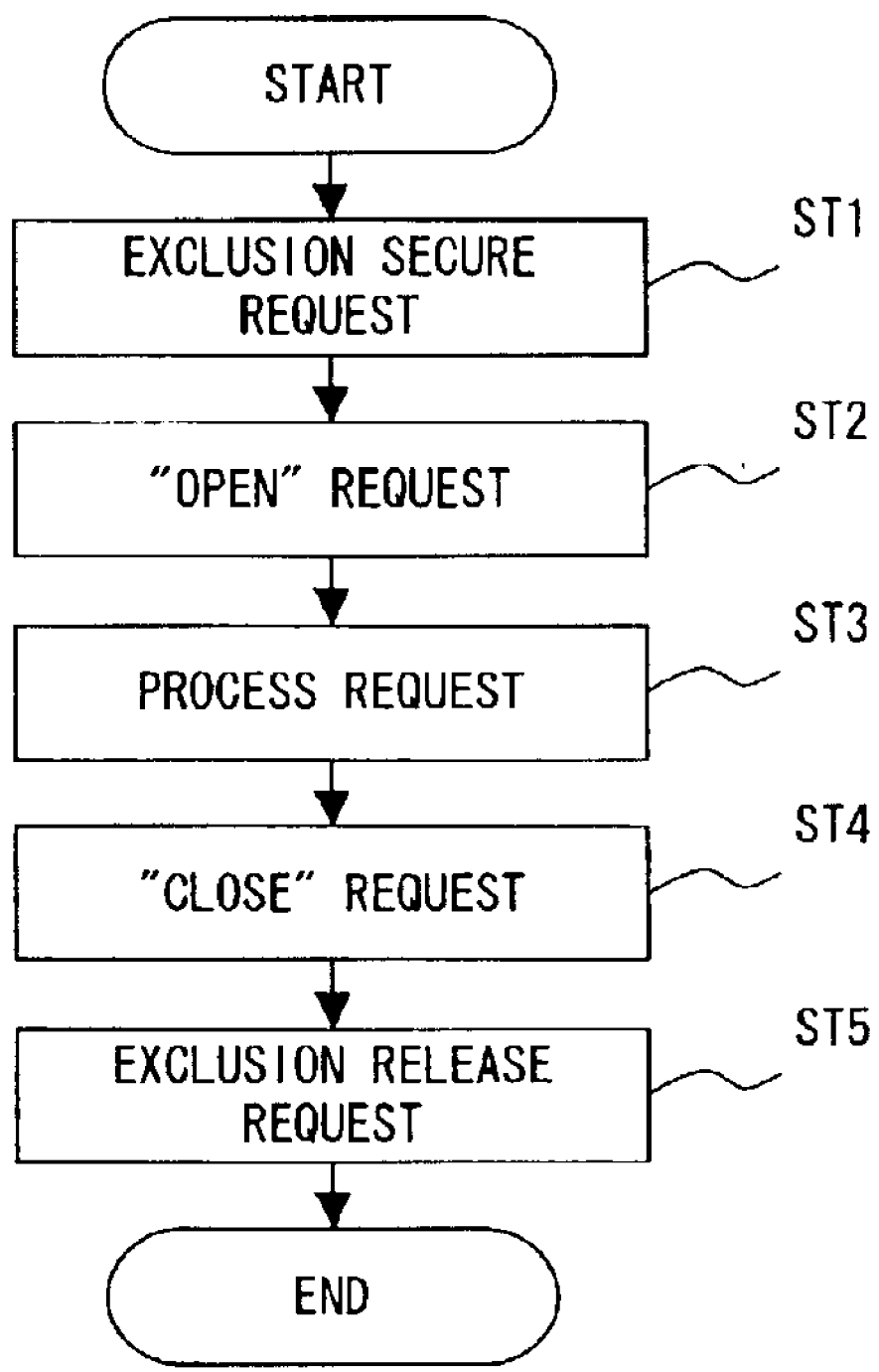
F I G. 7

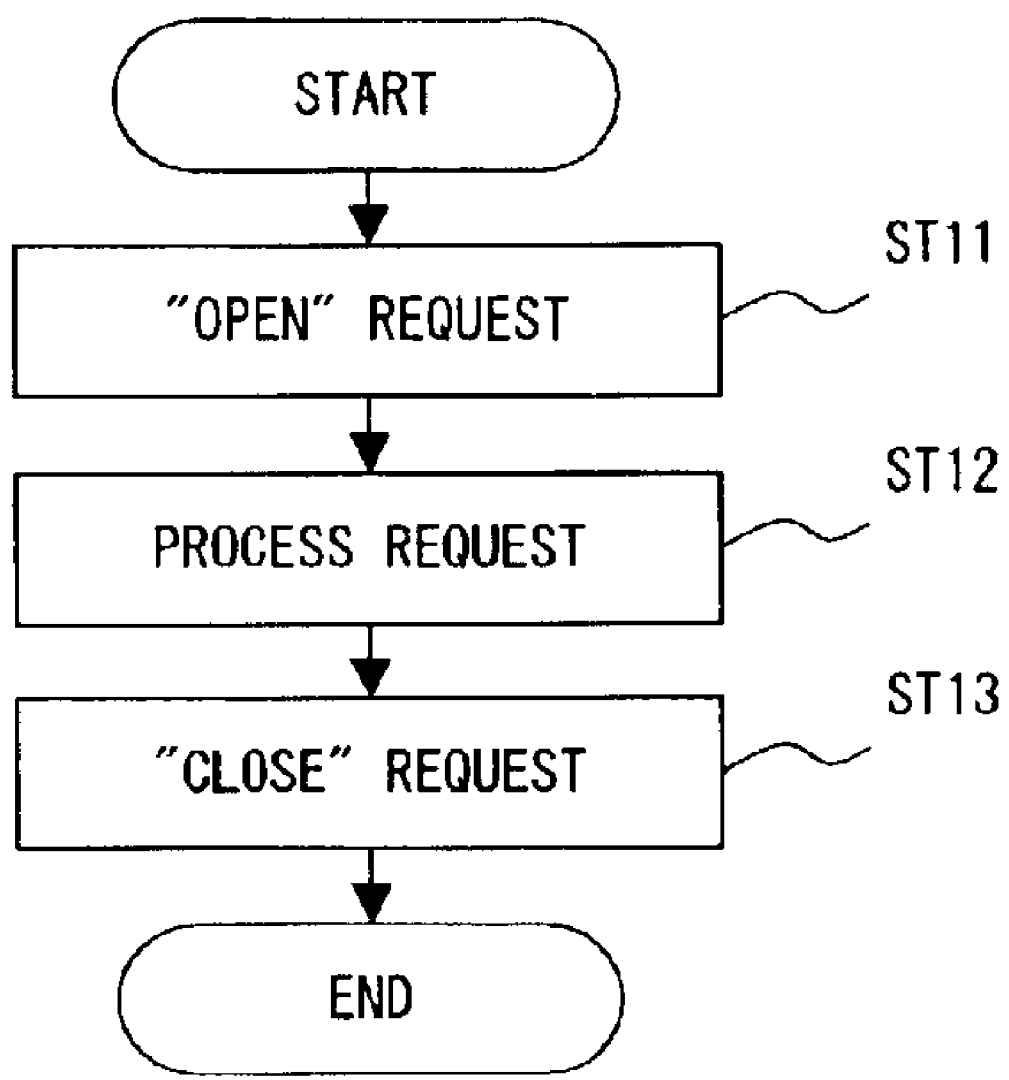
F I G. 8

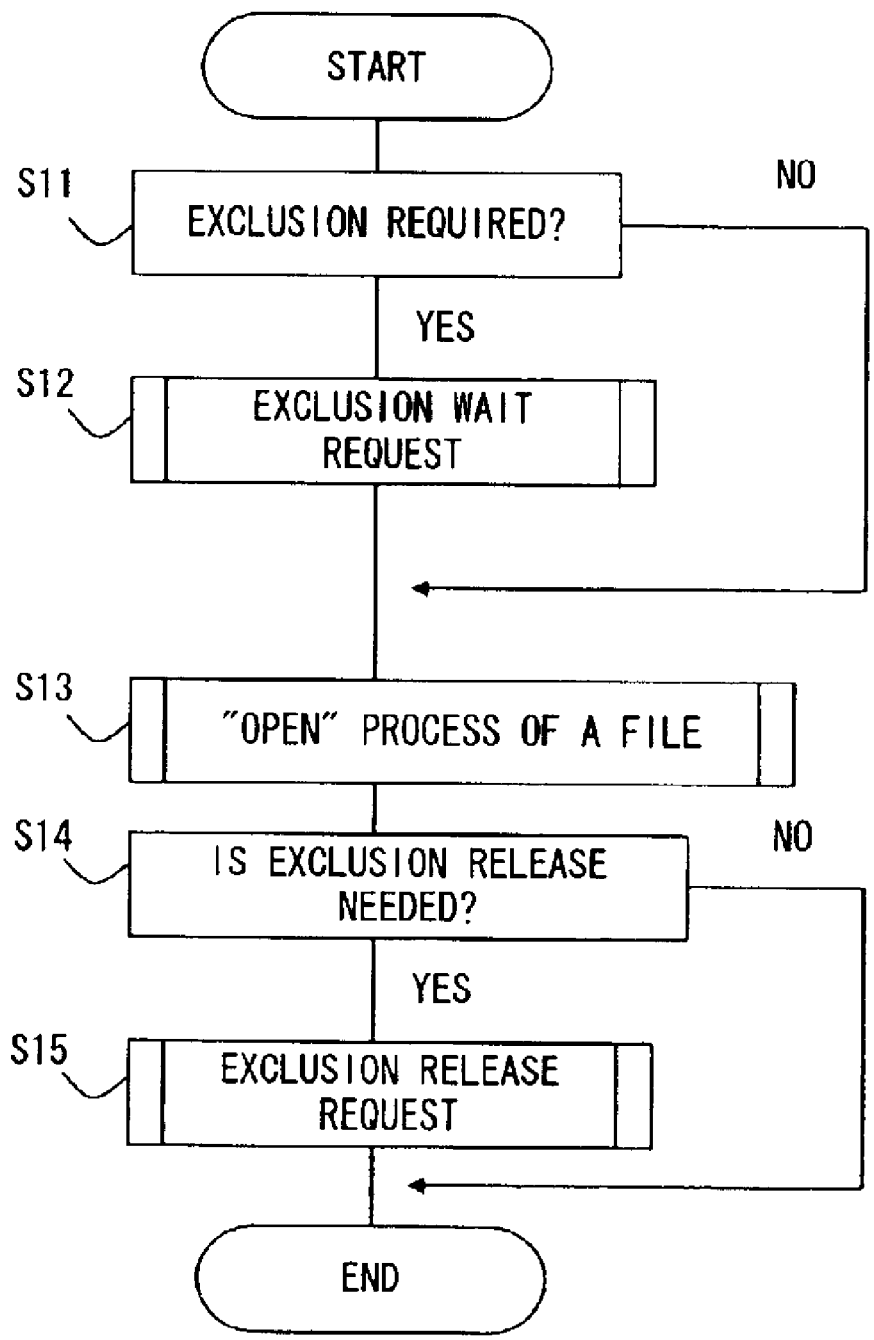
F I G. 1 2

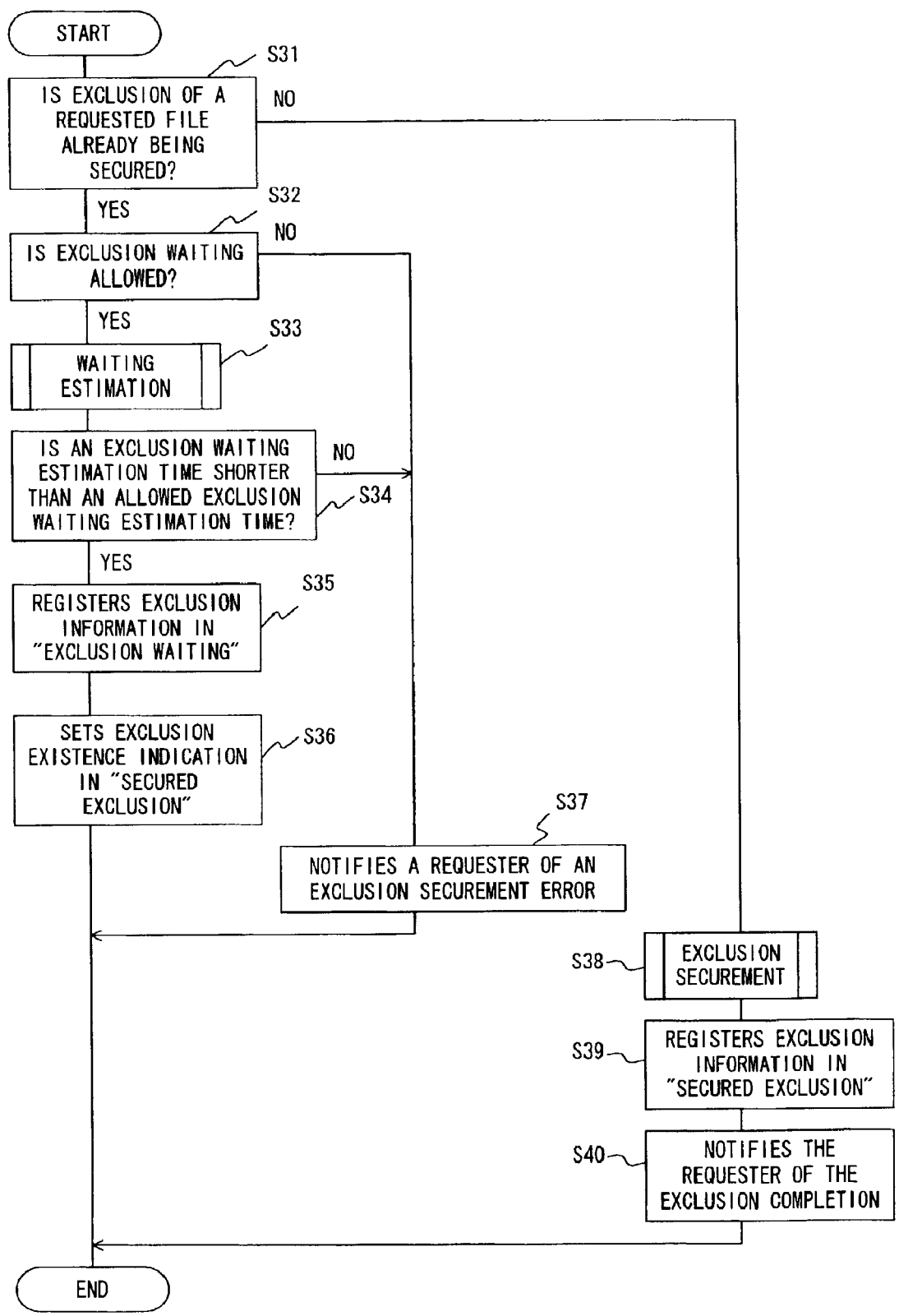
F I G. 14

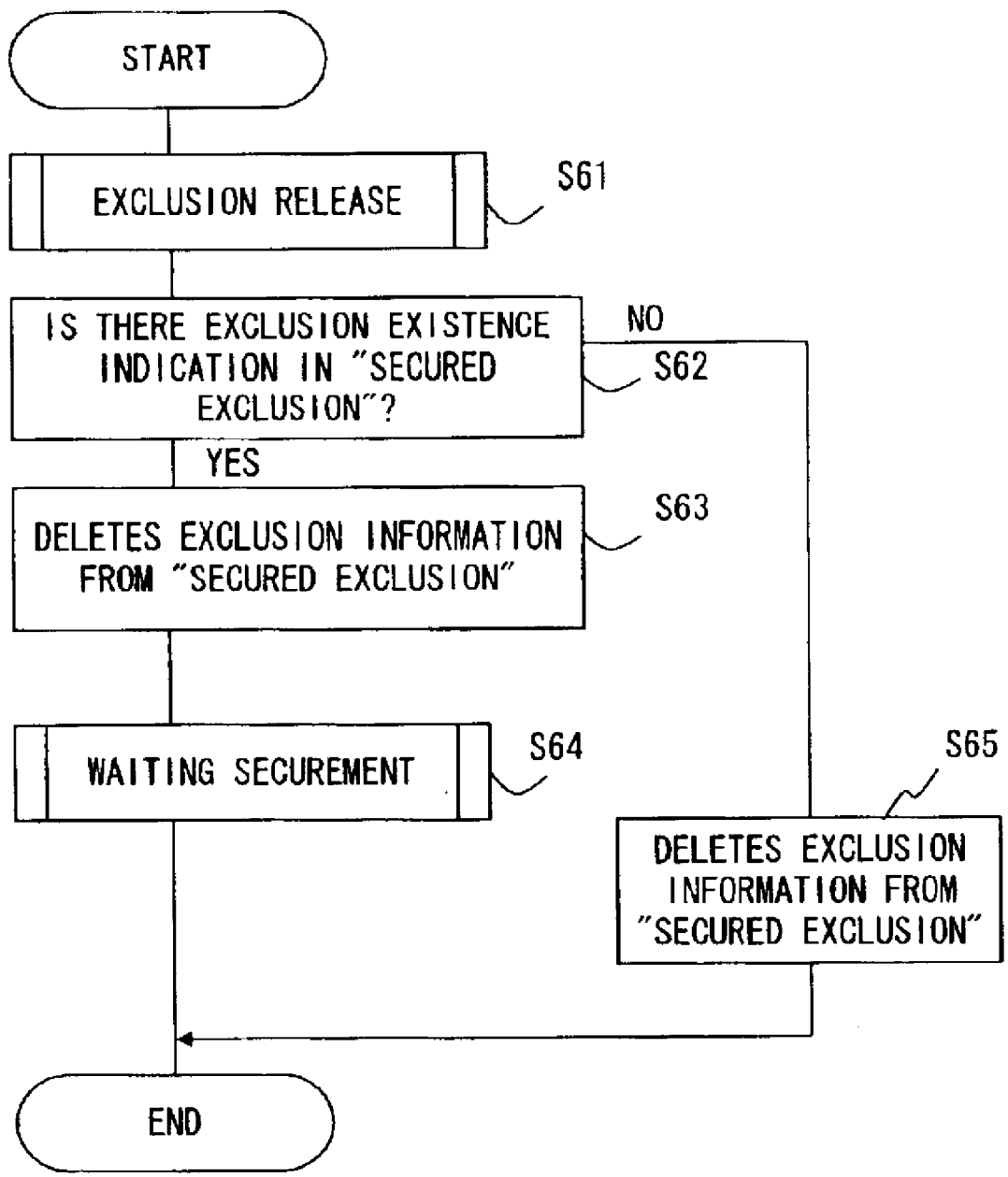
F I G. 1 7

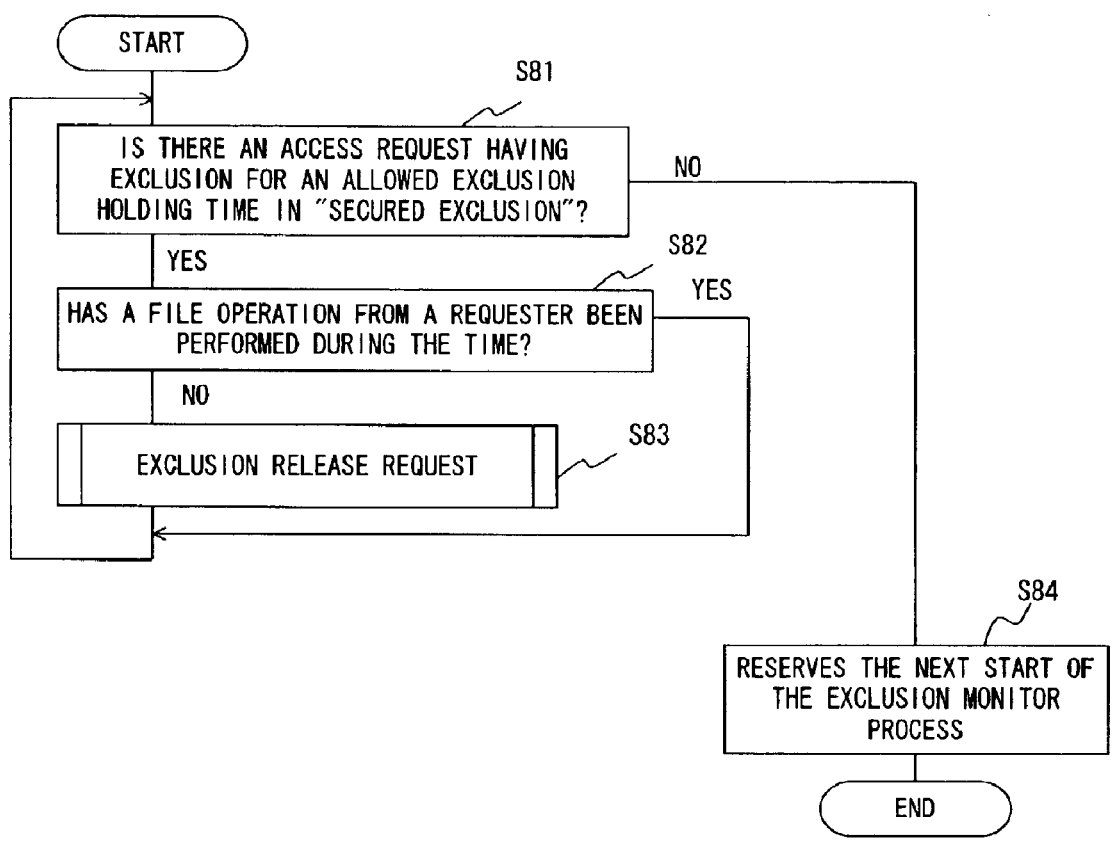
F I G. 19

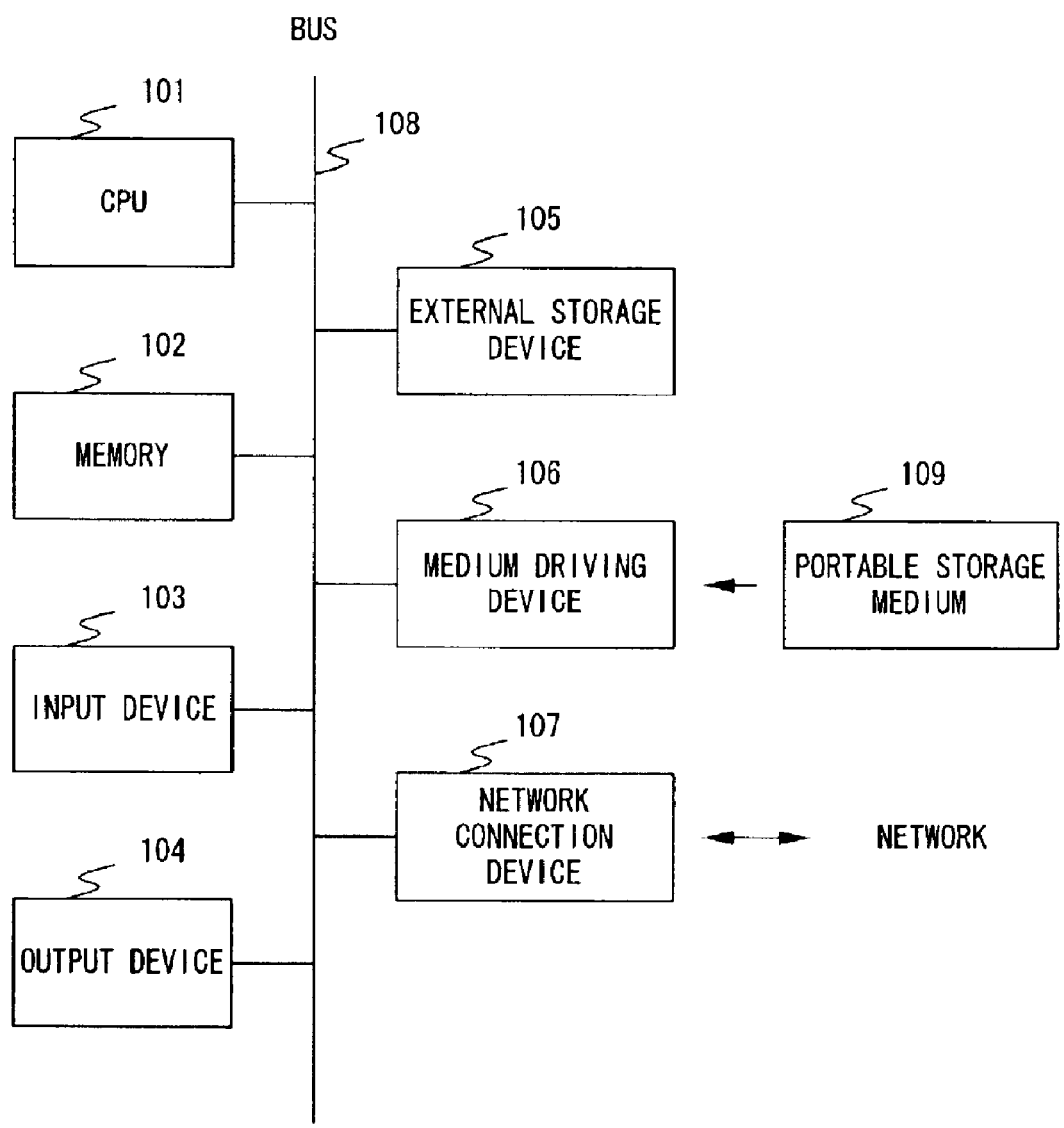
F I G. 2 1

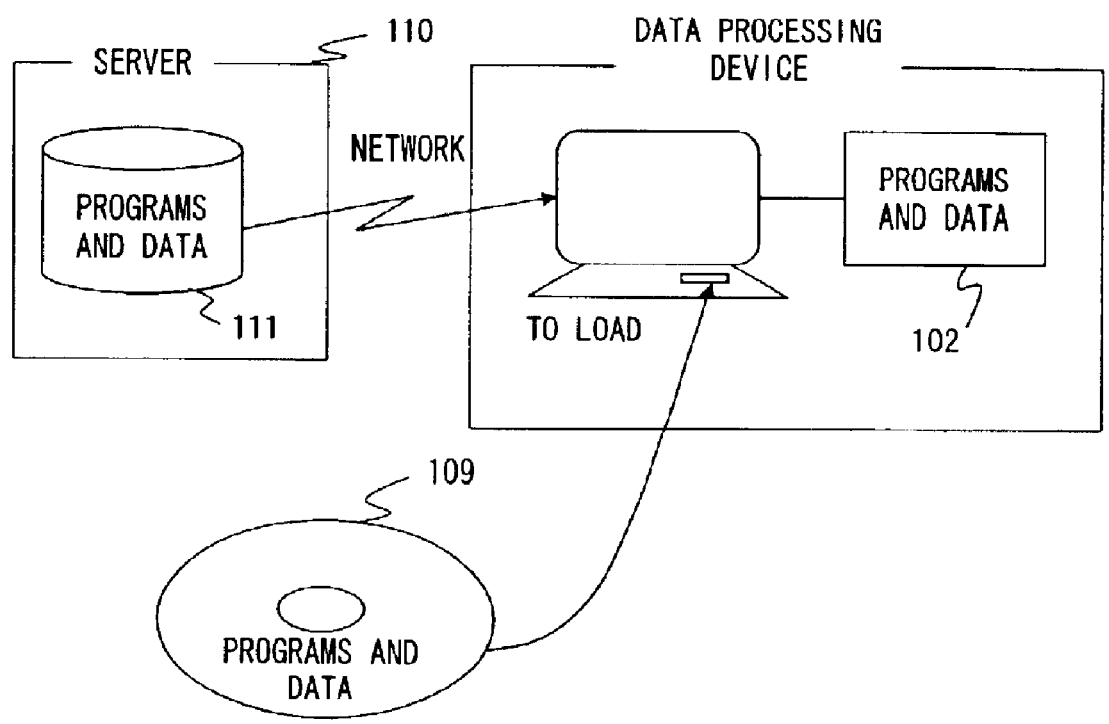
F I G. 2 2

CONTROL DEVICE FOR FILE RESOURCES IN A NETWORK

BACKGROUND FOR THE INVENTION

1. Field of the Invention

The present invention relates to a file control device handling access requests for file resources when a plurality of access sources in a use systems and a shared system simultaneously use file resources in a network system composed of the shared system and a plurality of use systems.

2. Description of the Related Art

A network system comprises a plurality of shared systems and a plurality of use systems, and these systems are connected to one another by communicable network resources, such as an LAN (local area network) and the like. Each of the shared systems publishes the resources, such as files, etc., of the system to other systems, and each of the use systems performs necessary processes using the resources published by the shared systems.

Each use system comprises applications and a client, and each shared system comprises shared files and a server. An application is a program generated by a user in order to do a job, and a client is a program called up by the application when the application uses the shared file. A shared file is published to the use systems by a shared system, and a server is a program called up by the client when the client uses the shared file.

When in a conventional network system, a plurality of applications use the same shared file, each application refers/updates the file after requesting exclusion. File exclusion by a specific application means that the application obtains a right to exclusively use the file.

However, in the network system described above, all the OSs (operating systems) of a plurality of use systems are not always the same. Sometimes, some systems adopt UNIX (™) and other systems adopt WINDOWS (™). Due to such a difference in platform, sometimes a UNIX (™) application requests exclusion, but a WINDOWS (™) application requests no exclusion.

In the same use system too, sometimes an application requesting exclusion and an application requesting no exclusion co-exist. Furthermore, sometimes, there are applications using a shared file in the shared system. For this reason, if the following conditions are met, data are destroyed.

(1) When a plurality of applications in a use system and a shared system simultaneously perform the update process of one shared file.

(2) When there is an application requesting no exclusion.

In this case, since there is an application requesting no exclusion, leak is caused in exclusion. As a result, the data writing in a file is duplicated by two or more applications and the data are destroyed since unintended data writing is performed.

SUMMARY OF THE INVENTION

It is an object of the present invention to provide a file control device preventing leak from being caused in exclusion when a plurality of applications in a use system and a shared system simultaneously use the same shared file in a network.

The file control device of the present invention is connected to a network having the first access source requesting the exclusion of a file resource and the second access source requesting no such exclusion. The file control device comprises an interface device, a request reception device, a registration device and a control device, and handles access requests for the file resource.

The interface device receives an access request from the first access source and an access request from the second access source through the network. The request reception device accepts an access request from the first access source, an access request from the second access source and an access request from the third access source in the file control device. The registration device registers the accepted access requests.

Then, the control device performs exclusive control over the file resource among the access requests from the first, second and third access sources in response to the access request from the second access source.

BRIEF DESCRIPTION OF THE DRAWINGS

FIG. 1 shows the configuration of the first network system;

FIG. 2 shows the configuration of the second network system;

FIG. 3 shows the configuration of the third network system;

FIG. 4 shows an exclusion timing setting;

FIG. 5 shows an exclusion competition setting;

FIG. 6 shows an exclusion error handling method;

FIG. 7 is a flowchart showing the process of the first application;

FIG. 8 is a flowchart showing the process of the second application;

FIG. 12 is a flowchart showing an "open" process;

FIG. 14 is a flowchart showing an exclusion wait request process;

FIG. 17 is a flowchart showing an exclusion release request process;

FIG. 19 is a flowchart showing an exclusion monitor process;

FIG. 21 shows the configuration of an information processing device; and

FIG. 22 shows a variety of storage media.

DESCRIPTION OF THE PREFERRED EMBODIMENTS

Figure 9:
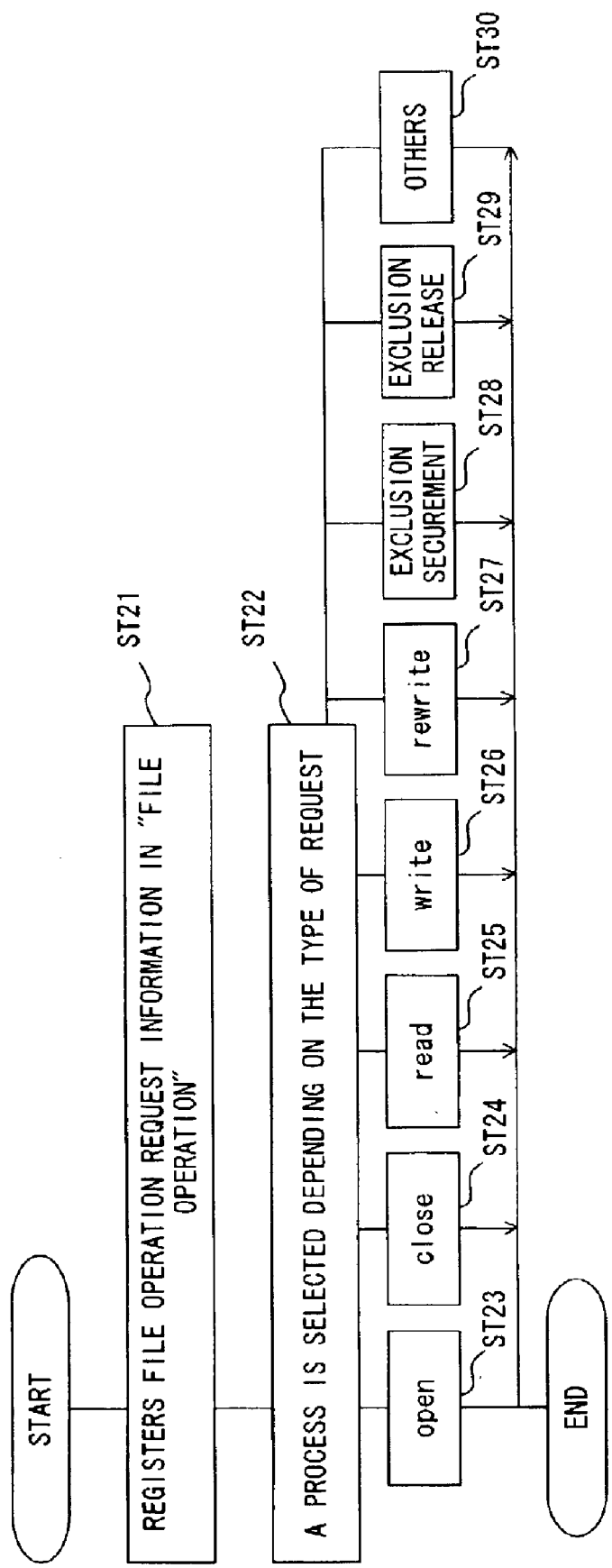
FIG. 9 is a flowchart showing the request reception process.

The preferred embodiments of the present invention are described in detail below with reference to the drawings.

The file control device of the present invention is connected to a network having the first access source requesting the exclusion of a file resource and the second access source requesting no such exclusion. The file control device comprises an interface device, a request reception device, a registration device and a control device, and handles access requests for the file resource.

The interface device receives an access request from the first access source and an access request from the second access source. The request reception device accepts the access request from the first access source, the access request from the second access source and an access request from the third access source in the file control device. The registration device registers the accepted access requests.

Then, the control device performs exclusive control over the file resource among the access requests from the first, second and third access sources in response to the access request from the second access source.

The first access source corresponds to, for example, an application requesting exclusion in a use system, and the second access source corresponds to, for example, an application requesting no exclusion in the same or a different use system. The third access source corresponds to, for example, an application requesting exclusion or an application requesting no exclusion in the shared system. The file control device realizes a shared file in a network by processing the respective access requests from these access sources.

The file control device corresponds to, for example, the combination device 3 shown in FIG. 1 or the file device 7 shown in FIG. 2, which are described later. The interface device corresponds to, for example, the NFS (network file system) server 25 or CIFS (common Internet file system) server 26 shown in FIG. 3, which is described later.

The request reception device corresponds to, for example, the request reception 31 shown in FIG. 3. The registration device corresponds to, for example, the file operation 43, exclusion waiting 44, secured exclusion 45 and exclusion log 46, which are all shown in FIG. 3. Then, the control device corresponds to, for example, exclusion wait request 32, exclusion release request 33, environmental setting 34, waiting estimation 35, exclusion monitor 36, waiting securement 37 and exclusion monitor 38, which are all shown in FIG. 3.

The interface device receives an access request from a use system through a network and transfers the access request to the request reception device. The request reception device acceptes the access request transferred from the interface device and an access request issued inside the shared system, and registers the access requests in the registration device. The control device automatically performs exclusive control over the file resource even if there is an access request from the second access source requesting no exclusion.

By providing such a file control device in the shared system, the file control device can collectively perform exclusive control, which conventionally is mainly performed by an application. Exclusive control can also be performed over not only an application in the use system but also an application in the shared system collectively.

In this way, even if an application requesting no exclusion uses a shared file, exclusion can be surely performed for the file. Therefore, there is no duplicated data writing, and the destruction of the shared file due to simultaneous data writing can be prevented.

FIG. 1 shows the configuration of a network system having a shared system and a plurality of use systems. The network system shown in FIG. 1 comprises use systems 1 and 2, a combination device 3 and disk devices 4. Each of the use systems 1 and 2 is connected to the combination device 3 through a LAN 5, and the disk devices 4 are connected to the combination device 3 through a SAN (storage area network) 6. The combination device 3, disk devices 4 and SAN 6 correspond to a shared system.

The use systems 1 and 2 adopt UNIX (™) and WINDOWS (™), respectively. These use systems both have an application requesting exclusion and an application requesting no exclusion. Although in FIG. 1, only two use systems are shown, generally, there are more of use systems in the LAN 5.

The disk devices 4 store shared files, and the SAN 6 is, for example, a high-speed communication network using fiber channels. The combination device 3 provides an access interface with a shared file for the use systems 1 and 2 in the LAN 5. As seen from the use systems 1 and 2 side, the combination device 3 corresponds to a NAS (network attached storage) server.

FIG. 2 shows the configuration of another network system. In the network shown in FIG. 2, the constituent components with the same reference numbers as in FIG. 1 have the same functions as those in FIG. 1. In this case, the file device 7 provided with the combination device 3 and a disk device 4 corresponds to a NAS server, and the file device 7, discrete disk devices 4 and SAN 6 correspond to the shared system.

In the network systems shown in FIGS. 1 and 2, either the combination device 3 or the file device 7 is used as a file control device, and a file system in the combination device 3 performs exclusive control.

Usually, access to a shared file from an application in a use system is made by a file operation, such as "open"/"close"/"read"/"write"/"rewrite", etc., and these file operation services are provided by a file system in the shared system. In this preferred embodiments, the following exclusive control processes are added to the file system.

(1) The setting of an exclusion environment (the operational environment of exclusive control) designated by a user is added.
(2) A process requesting a file system to secure exclusion (exclusion wait request) is added to processes needed to secure exclusion, such as "open"/"read"/"write"/"rewrite", etc.
(3) A process requesting a file system to release exclusion (exclusion release request) is added to processes needed to release exclusion, such as "close", etc.
(4) A process reserving the exclusion securement of file resources being used exclusively (exclusion waiting) is added.
(5) An exclusion monitor process and an exclusion release process are added as measures against a case where an application terminates while holding exclusion.

Exclusion timing and a process content are set together as exclusion environments.

By adding such processes to the file system, the file system can collectively perform exclusive control instead of an application. Therefore, even if there are respective access requests for the same shared file, from an application requesting exclusion in the use system 1, an application requesting no exclusion in the use system 2 and an application in the shared system, exclusion can be surely performed.

Even if there are respective access requests for the same shared file from an application requesting exclusion and an application requesting no exclusion in the same use system, and an application in the shared system too, exclusion can be surely performed.

Furthermore, even if there are respective access requests for the same shared file from applications in the use systems 1 and 2, and an application requesting no exclusion in the shared system too, exclusion can be surely performed.

FIG. 3 shows the configuration of a network system where a file system in the shared system performs exclusive control. The network system shown in FIG. 3 comprises use systems 11 and 12, and a shared system 13. The use system 11 corresponds to the use system 1 shown in FIGS. 1 and 2, the use system 12 corresponds to the use system 2 shown in FIGS. 1 and 2, and the shared system 13 corresponds to the combination of the combination device 3 shown in FIG. 1 or the file device 7 shown in FIG. 2, the disk devices 4, and the SAN 6.

The use system 11 comprises an application 21 and an NFS client 22, and the use system 12 comprises an application 23 and CIFS client 24. The application 21 requests access to a file of the NFS client 22, and the application 23 requests access to a file of the CIFS client 24.

The shared system 13 comprises an NFS server 25, a CIFS server 26, an application 27, a file system 28, an operational environment 42, a file operation 43, exclusion waiting 44, secured exclusion 45, an exclusion log 46 and file resources 47. Of these, the NFS server 25, CIFS server 26, application 27, file system 28, operational environment 42, file operation 43, exclusion waiting 44, secured exclusion 45 and exclusion log 46 are installed in the combination device 3 shown in FIGS. 1 and 2. The file resources 47 correspond to a shared file in the disk device 4.

The NFS server 25 receives an access request from the NFS client 22, while the CIFS server 26 receives an access request from the CIFS client 24. The NFS server 25 and CIFS server 26 operate as applications which use the file system 28, and transfer respective access requests issued by the applications 21 and 23 to the file system 28. This function is realized by, for example, a pipe providing a communication protocol to be used between different systems.

The application 27 requests access to a file of the file system 28 and provides the applications 21 and 23 with a prescribed service using the data in the file. In this case, there ate two types of application 27, that is, an application requesting exclusion and an application requesting no exclusion.

The file system 28 provides a service of enabling the applications 21, 23 and 27 to use a plurality of discontinuous blocks in a hard disk as one file, and accesses the file resources 47 in response to an access request from the NFS server 25, CIFS server 26 or application 27.

The file system 28 comprises programs of request reception 31, exclusion release 32, exclusion securement 33, environmental setting 34, waiting estimation 35, waiting monitor 36, waiting securement 37, exclusion monitor 38, exclusion release 39, exclusion securement 40 and device access 41, and performs exclusive control while referring to/updating data of operational data 42, file operation 43, exclusion waiting 44, secured exclusion 45 and exclusion log 46.

In this case, the request reception 31 calls up exclusion wait request 32, exclusion release request 33 and device access 41, as requested. The exclusion waiting 32 confirms an exclusion status, requests exclusion and so forth. The exclusion release request 33 releases exclusion, releases exclusion waiting and so forth. The device access 41 accesses the file resources 47 in response to an access request.

According to such a system, exclusion is collectively controlled by the file system 28 performing file operations. Therefore, there is no duplicated data writing due to an application error (the non-acquisition of exclusion, an acquisition of erroneous exclusion, etc.), and the destruction of a shared file due to simultaneous data writing can be prevented, accordingly.

Next, data registered in the operational environment 42 of the shared system shown in FIG. 3 are described with reference to FIGS. 4 through 6. A user sets the following parameters in the operational environment 42.

(a) Exclusion range (range where exclusion is performed)
(b) Exclusion timing (timing when exclusion is performed in a file operation, such as "open"/"close", etc.)
(c) Exclusion competition (competition relation between already secured exclusion and newly requested exclusion)
(d) Exclusion error handling method (method for notifying an application of an error when there is an error)
(e) Allowed exclusion holding time (time limit for automatically releasing exclusion held for a long time)
(f) Allowed exclusion waiting time (time limit for automatically releasing long-time exclusion waiting)
(g) Allowed exclusion waiting estimation time (time limit for performing an error process when a long-time exclusion waiting is anticipated)

Out of these parameters, for the designation method of (a) exclusion range, for example, the following methods can be used.

(1) The service range of a file system is collectively designated.
(2) Exclusion is designated for each file.
   Exclusion is designated when a file is generated.
   Exclusion is designated for each directory with a file.
   A file extension is designated (*.txt, *.doc, *.exe, etc.)
   The generic term of a file name is designated (wild cards, such as AB*, A*B, *AB, etc., are used).
   The range of file names is designated (aaa to ccc, etc.)
   Non-exclusion file names are designated (¬aaa, etc.)
   A combination of some of the designation methods described above The system can unconditionally determine (b) exclusion timing. However, in this preferred embodiment, as shown in FIG. 4, a user sets the "open"/"close" time, "read"/"write" time of a file or one of their combinations as exclusion timing. In this case, the user performs an environmental setting by designating the existence/non-existence of exclusion securement and exclusion release for each combination of a file operation command and mode.

As the parameter of (c) exclusion competition, what exclusive control should be performed when there is an access request for file resources in which exclusion is already secured, is set. The system can also unconditionally set such a parameter. However, in this preferred embodiment, as shown in FIG. 5, a user can set what exclusive control should be performed. In this case, the user performs an environmental setting by designating "normal" or "abnormal" for each combination of a requested exclusion ("read" or "write") and already secured exclusion ("read" or "write").

For example, if already secured exclusion is "read" and requested exclusion is also "read", reading competition occurs. However, if this competition is allowed to happen, "normal" is set. If this reading competition is not allowed to happen, "abnormal" is set. If "normal" is set, exclusion is not performed. If "abnormal" is set, an error process and exclusion waiting are performed.

As the parameter of (d) exclusion error handling method, how an exclusion error, exclusion waiting and exclusion securement should be handled is set when exclusive control is realized by a program other than an application (when an application does not request exclusion) as in this preferred embodiment.

Since such a parameter indicates how an error is reported to the application except when exclusion is normally secured, the error can also be unconditionally reported. However, in this preferred embodiment, as shown in FIG. 6, a user can set an error notification method and a notification code. In this case, the user performs an environmental setting by designating an error notification method and a notification code depending on an exclusion status.

When an application requests exclusion, the application designates an exclusion method and the like. Therefore, the result of the designated exclusion is reported to the application.

As the parameter of (e) allowed exclusion-holding time, an allowance value (a specific time period) of an exclusion holding time is set. Since a use system and a shared system are connected through a network, if either a client or a server is out of order, the other cannot be notified of the failure. In this case, if exclusion continues to be secured, the exclusion cannot be released until the system where the failure has occurred is re-activated. If an application in the shared system is abnormally terminated and exclusion continues to be secured, the exclusion cannot be released unless the application is re-activated. Therefore, if there is no file operation request from a requester having obtained exclusion even after the allowed exclusion-holding time, the exclusion is compulsorily released.

As the parameter of (f) allowed exclusion-waiting time, the allowance value (a specific time period) of exclusion-waiting time is set. An application service is affected when a waiting time due to exclusion exceeds a specific time period. Therefore, if the waiting time exceeds the allowed exclusion-waiting time, it is regarded as an exclusion error.

As the parameter of (g) allowed exclusion-waiting estimation time, the allowance value (a specific time period) of an exclusion-waiting estimation time is set. If it is anticipated that an exclusion waiting time will exceed a specific time period, it is anticipated that an application service will be affected. Therefore, if it is anticipated that a waiting time due to exclusion will exceed the allowed exclusion-waiting estimation time, it is regarded as an exclusion error.

A user can customize exclusive control by designating the parameters of such an operational environment 42.

Next, data registered in the file operation 43, exclusion waiting 44, secured exclusion 45 and exclusion log 46 are described. The data are, for example, stored in a form of table in a memory.

The file operation 43 stores the following pieces of information for each file to be processed.
  File handle (identification information for specifying a file, and it is returned at the time of "open")
  Process ID (identification information for specifying an application or a process)
  Final file operation type ("open", "close", "read", "write", etc.)
  Final file operation parameter (parameter of a final file operation)
  Final file operation time (year, month, day, hour, minute, second, 1/1000 second)

The exclusion waiting 44 stores the following pieces of information for each exclusion waiting.
  File handle
  Process ID (identification information for specifying an application or a process waiting for exclusion)
  Exclusion request time (year, month, day, hour, minute, second, 1/1000 second)
  Exclusion type (reading/writing exclusion and user/system exclusion)
  Exclusion range (file designation and the exclusion range of a file (top/end offset))

User exclusion means to perform exclusion for file resources designated by a user, and system exclusion means to compulsorily perform exclusion for all users using a file system.

Secured exclusion 45 stores the following pieces of information for each exclusion.
  File handle
  Process ID (identification information for specifying an application or a process for which exclusion is secured)
  Exclusion request time
  Exclusion securement time (year, month, day, hour, minute, second, 1/1000 second)
  Exclusion type
  Exclusion range
  Exclusion waiting (pointer to the relevant entry of exclusion waiting 44)

Exclusion log 46 is obtained when exclusion is requested, when exclusion is secured or when exclusion is released, and it stores the following pieces of information.
  File handle
  Process ID (identification information for specifying an application or a process for which exclusion is secured)
  Exclusion request time
  Exclusion securement time
  Exclusion type
  Exclusion range
  Exclusion release time (year, month, day, hour, minute, second, 1/1000 second)
  Exclusion release reason (user designation, compulsory release after a specific time has been elapsed)

Next, an exclusive control process in the network system shown FIG. 3 is described in detail with reference to FIGS. 7 through 20.

FIG. 7 is a flowchart showing the process of an application requesting exclusion in the use systems 11 and 12, and the shared system 13. First, this application issues an exclusion secure request for a file to be accessed to the clients 22 and 23, or the file system 28 (step ST1) and further issues an "open" request (step ST2). Then, the application issues a process request needed to access the content of a file ("read" request, "write" request, "rewrite" request, etc.) (step ST3). Then, the application issues a "close" request (step ST4), and further issues an exclusion release request (step ST5). The issued requests are transferred to the request reception 31 of the file system 28.

FIG. 8 is a flowchart showing the process of an application requesting no exclusion in the use systems 11 and 12, or the shared system 13. Processes in steps ST11 through ST13 shown in FIG. 8 are the same as those in steps ST2 through ST4 shown in FIG. 7. This application issues neither an exclusion secure request nor an exclusion release request unlike the application shown in FIG. 7.

FIG. 9 is a flowchart showing the process of the request reception 31. First, the request reception 31 registers information about a file operation requested by an application in the file operation 43 (step ST21).

Then, the request reception 31 selects a process depending on the type of a request from the application (step ST22), and performs "open" (step ST23), "close" (step ST24), "read" (step ST25), "write" (step ST26), "rewrite" (step ST27), exclusion securement (step ST28), exclusion release (step ST29) or others (step ST30).

Figure 10:
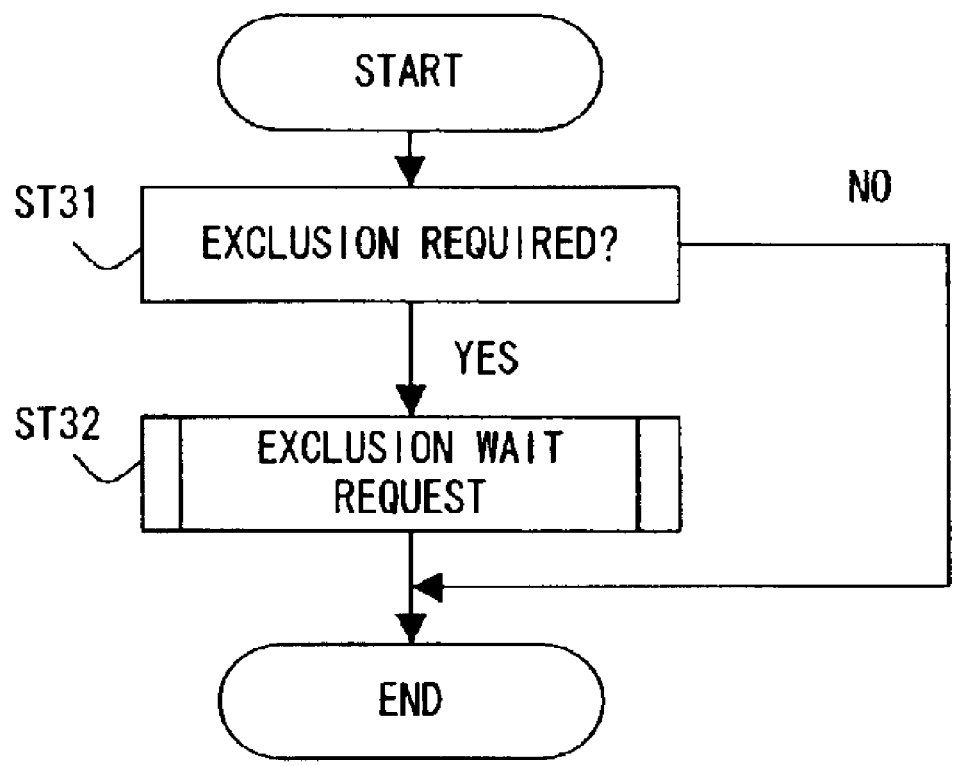
FIG. 10 is a flowchart showing the exclusion securement process.

FIG. 10 is a flowchart showing the exclusion securement process performed in step ST28 shown in FIG. 9. First, the request reception 31 refers to the exclusion range of the operational environment 42 and judges whether exclusion is required (step ST31). If it is judged that exclusion is required, the request reception 31 calls up an exclusion wait request 32 (step ST32). If it is judged that exclusion is not required, the request reception 31 terminates the process without further performing any process.

Figure 11:
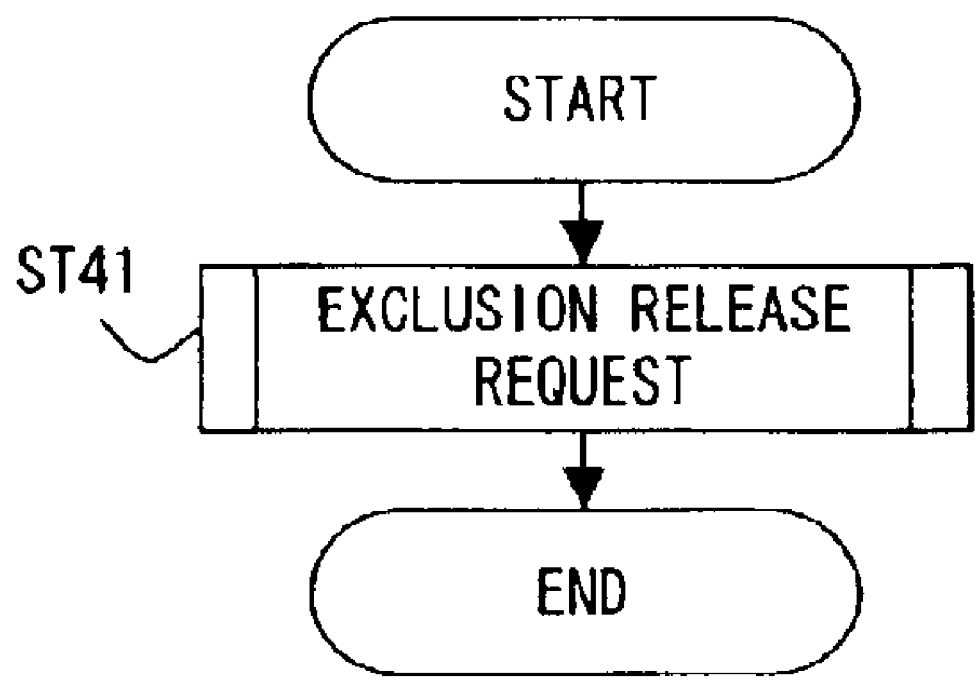
FIG. 11 is a flowchart showing an exclusion release process.

FIG. 11 is a flowchart showing the exclusion release process performed in step ST29 shown in FIG. 9. In this process, the request reception 31 calls up the exclusion release request 33 (step ST41).

Since almost the same exclusive control is performed in "open", "read", "write" and" rewrite" out of the processes shown in FIG. 9, an "open process is described as an example.

FIG. 12 is a flowchart showing the "open" process performed in step ST23 shown in FIG. 9. First, the request reception 31 refers to the exclusion range and exclusion timing of the operational environment 42, and judges whether exclusion is required (step S11). If it is judged that exclusion is required, the request reception 31 refers to the exclusion timing and exclusion competition of the operational environment 42 and calls up the exclusion wait request 32 (step S12). If exclusion is secured, the request reception 31 performs the "open" process of a file (step S13). If it is judged that exclusion is not required, the request reception 31 immediately performs the process in step S13.

Then, the request reception 31 refers to the exclusion timing and judges whether exclusion release is required (step S14). If it is judged that exclusion release is required, the request reception 31 calls up exclusion release request 33 (step S15) and it terminates the process. If it is judged that exclusion release is not required, the request reception 31 terminates the process without further performing any process.

Figure 13:
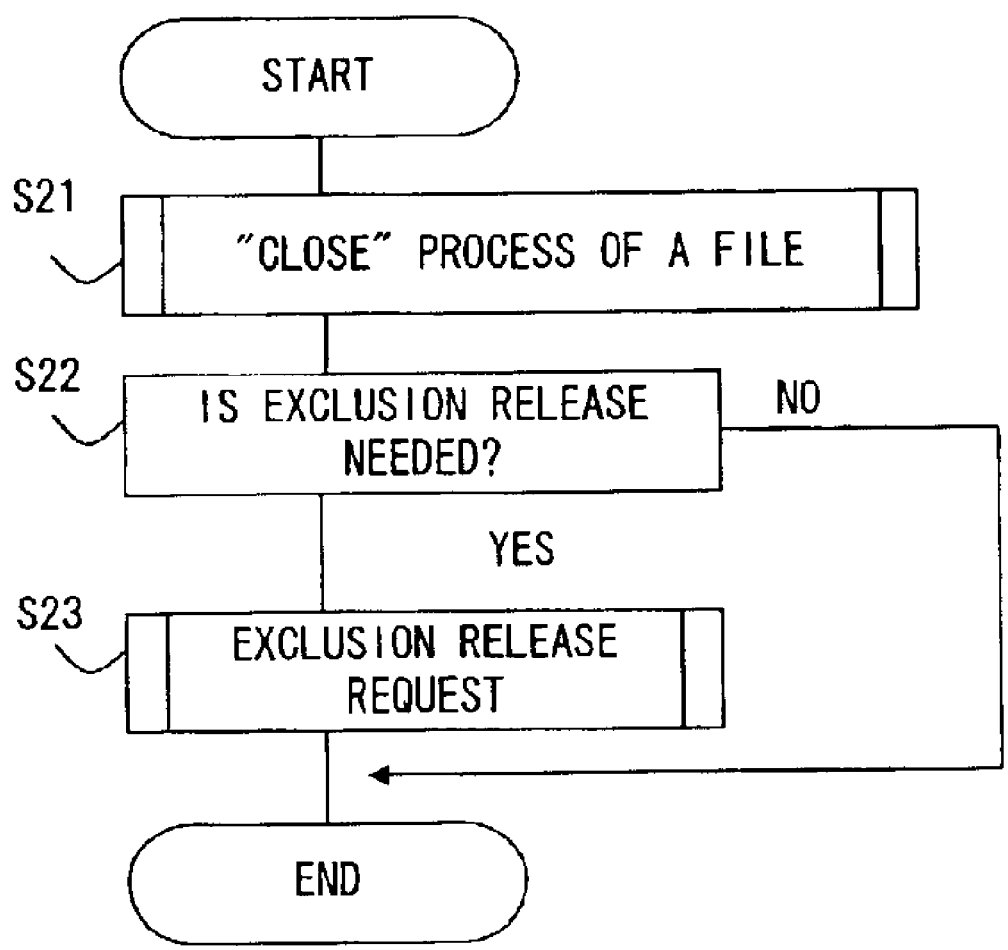
FIG. 13 is a flowchart showing a "close" process.
Figure 15:
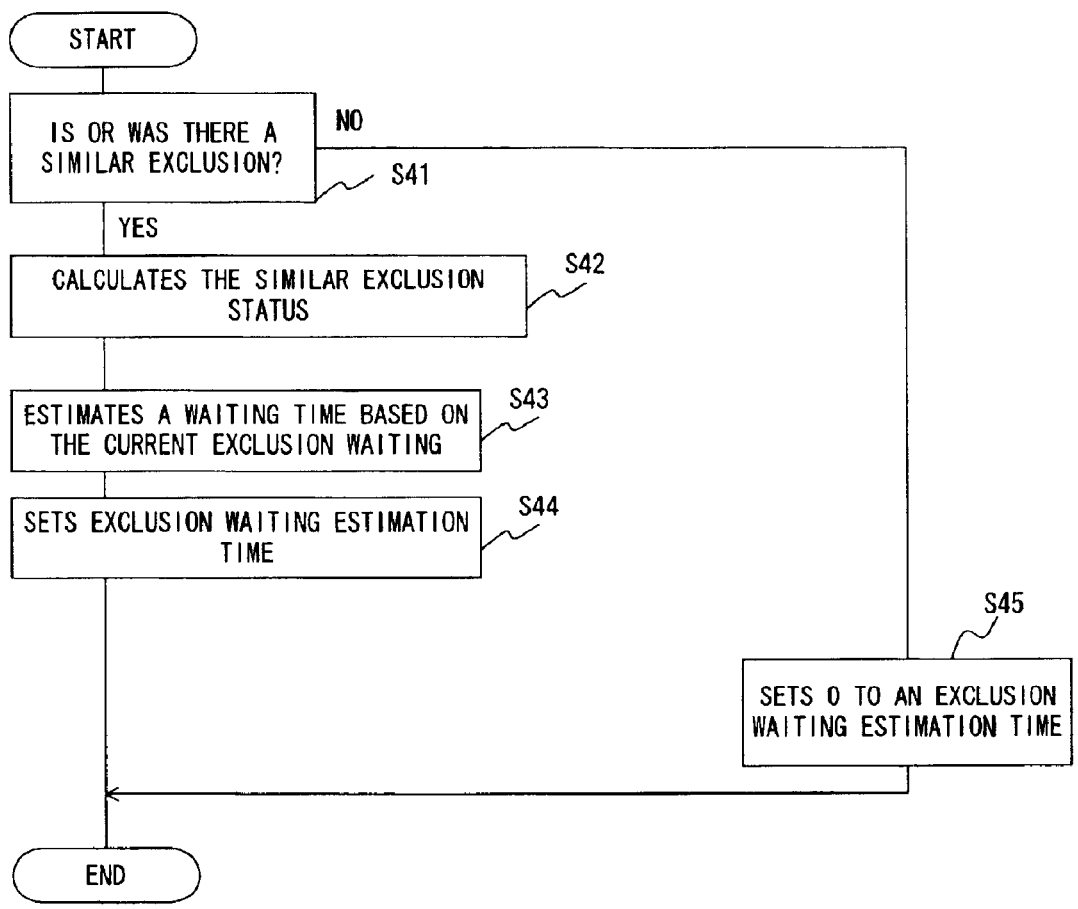
FIG. 15 is a flowchart showing a waiting estimation process.

FIG. 13 is a flowchart showing the "close" process performed in step ST24 shown in FIG. 9. First, the request reception 31 performs the "close" process of a file (step S21). Then, the request reception 31 refers to the exclusion timing of the operational environment 42 and judges whether exclusion release is required (step S22). If it is judged that exclusion release is required, the request reception 31 calls up the exclusion release request 33 (step S23) and terminates the process. If it is judged that exclusion release is not required, the request reception 31 terminates the process without further performing any process.

In step S13 shown in FIG. 12 and step S21 shown in FIG. 13, the request reception 31 calls up the device access 64, and the called device access 64 accesses the file resources 47.

FIG. 14 is a flowchart showing the process of the exclusion wait request 32 called up in step ST32 shown in FIG. 10 and in step S12 shown in FIG. 12. First, the exclusion wait request 32 refers to the secured exclusion 45 and checks whether exclusion of the requested file is already secured (step S31). If the exclusion of the file is being secured, then the exclusion wait request 32 refers to the exclusion error handling method of the operational environment 42 and judges whether exclusion waiting is allowed (step S32). If exclusion waiting is allowed, the exclusion wait request 32 calls up the waiting estimation 35 (step S33). The called waiting estimation 35 performs the process shown in FIG. 15.

First, the waiting estimation 35 refers to the exclusion log 46 and checks whether there is or has been a similar exclusion (step S41). The similar exclusion corresponds to, for example, exclusion information with the same file handle.

If the similar exclusion is recorded in the exclusion log 46, the exclusion status is calculated (step S42). In this case, for example, an average exclusion-holding time is calculated by dividing the total exclusion-holding time of a plurality of recorded exclusions by the number of the exclusions. The exclusion-holding time can be calculated as a difference between an exclusion securement time and an exclusion release time that are stored in the exclusion log 46.

Then, a waiting time is estimated based on the current status of exclusion waiting (step S43). In this case, an estimation time can be calculated by multiplying the calculated average exclusion-holding time by the number of current waiting requests. Then, the calculated time is set as an exclusion waiting estimation time (step S44).

If in step S41 a similar exclusion is not recorded in the exclusion log 46, it is judged that a waiting time cannot be estimated, and 0 is set as an exclusion waiting estimation time (step S45).

If the waiting estimation finishes, the exclusion waiting request 32 compares the set exclusion-waiting estimation time with the allowed exclusion-waiting estimation time of the operational environment 42 (step S34 shown in FIG. 14). If the set exclusion-waiting estimation time is shorter than the allowed exclusion-waiting estimation time, the exclusion waiting request 32 registers exclusion information in the exclusion waiting 44 (step S35) and sets the existence indication of a waiting exclusion in the secured exclusion 45 (step S36). In this case, a pointer to the information registered in the exclusion waiting 44 is set as the existence indication of a waiting exclusion.

If in step S32 exclusion waiting cannot be allowed or in step S34 the exclusion-waiting estimation time is equal to or longer than the allowed exclusion-waiting estimation time, the exclusion wait request 32 refers to the exclusion error handling method of the operational environment 42 and notifies a requester of an exclusion securement error (step S37).

If in step S31 the exclusion of the requested file is not being secured, the exclusion wait request 32 refers to the exclusion timing of the operational environment 42 and calls up the exclusion securement 40 (step S38). The called exclusion securement 40 secures the exclusion of the requested file.

Then, the exclusion wait request 32 registers exclusion information in the secured exclusion 45 (step S39), refers to the exclusion error handling method of the operational environment 42 and notifies the requester of exclusion completion (step S40).

Figure 16:
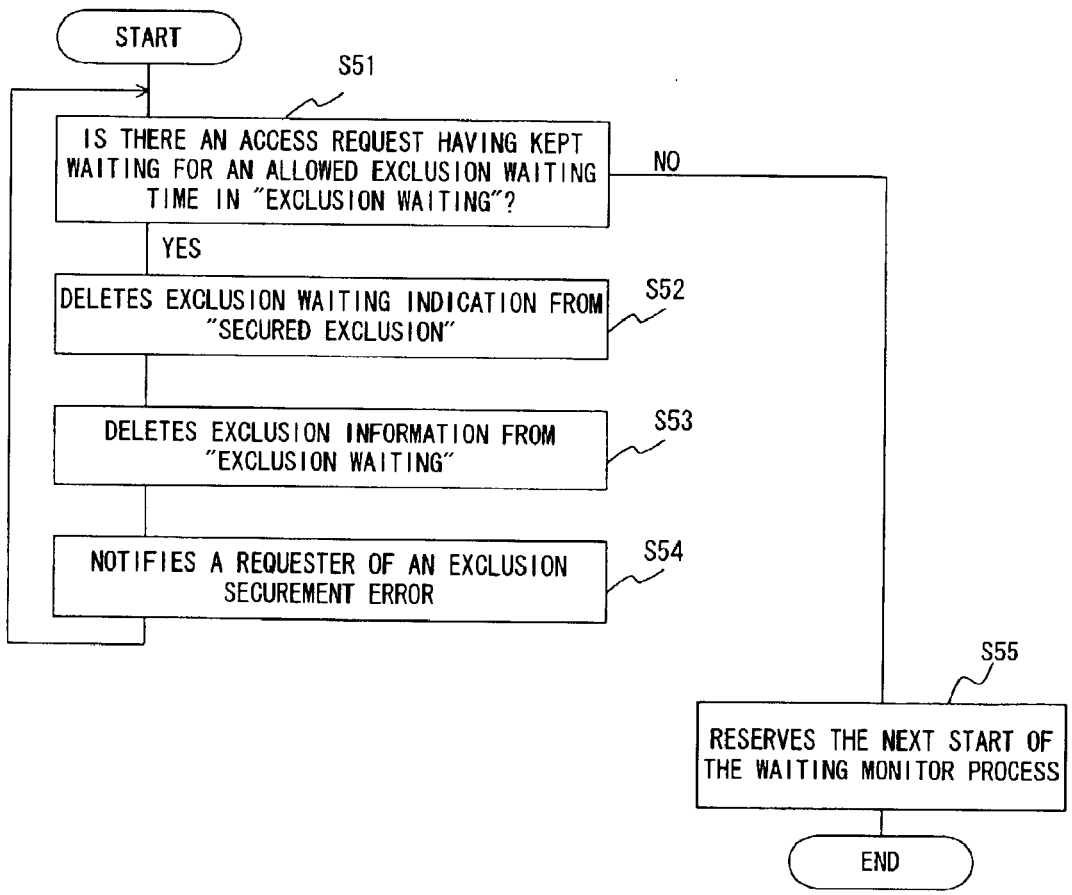
FIG. 16 is a flowchart showing a waiting monitor process.

FIG. 16 is a flowchart showing the process of the waiting monitor 36. First, the waiting monitor 36 checks whether there is exclusion information, waiting time of which is equal to or longer than the allowed exclusion waiting time of the operational environment 42, in the exclusion waiting 44 (step S51). If there is such exclusion information, the waiting monitor 36 deletes the existence indication of a waiting exclusion from the secured exclusion 45 (step S52) and deletes exclusion information from the exclusion waiting 44 (step S53).

Then, the waiting monitor 36 refers to the exclusion error handling method of the operational environment 42, notifies the requester of an exclusion securement error (step S54) and repeats the processes in and after step S51. If in step S51, there is no more exclusion information, waiting time of which is equal to or longer than the allowed exclusion waiting time, the next starting time of the waiting monitor 36 is reserved (step S55) and the process is terminated.

FIG. 17 is a flowchart showing the process of the exclusion release request 33 called up in step ST41 shown in FIG. 11, in step S15 shown in FIG. 12 and in step S23 shown in FIG. 13. First, the exclusion release request 33 calls up the exclusion release 39 (step S61) The called exclusion release 39 releases the exclusion of the requested file.

Then, the exclusion release request 33 checks whether the existence of a waiting exclusion is indicated in the secured exclusion 45 (step S62). If the existence of a waiting exclusion is indicated, the exclusion release request 33 deletes exclusion information from the secured exclusion 45 (step S63), refers to the exclusion timing of the operational environment 42 and calls up the waiting securement 37 (step S64).

In this way, the waiting securement 37 secures the exclusion for exclusion information in exclusion waiting 44 pointed to by the pointer of the deleted exclusion information. In other words, exclusion is newly secured for another request waiting for the exclusion release of the file.

If in step S62 the existence of a waiting exclusion is not indicated in the secured exclusion 45, the exclusion release request 33 deletes exclusion information from the secured exclusion 45 (step S65) and terminates the process.

Figure 18:
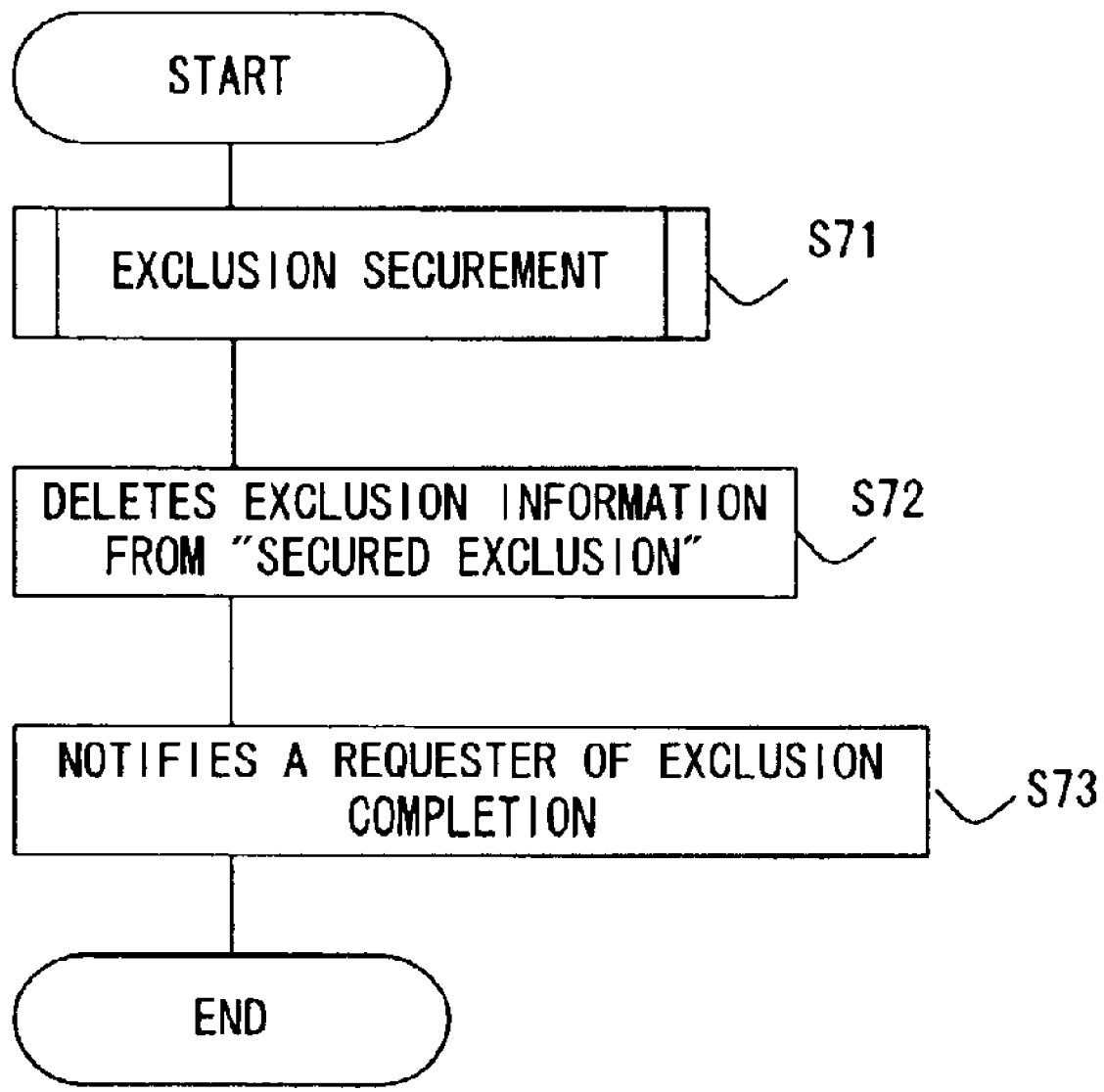
FIG. 18 is a flowchart showing a waiting securement process.

FIG. 18 is a flowchart showing the process of the waiting securement 37 called up in step S64 shown in FIG. 17. First, the waiting securement 37 calls up the exclusion securement 40 (step S71). The called exclusion securement 40 secures the exclusion of the requested file.

Then, the waiting securement 37 deletes exclusion information from the exclusion waiting 44 (step S72), refers to the exclusion error handling method of the operational environment 42 and notifies the requester of exclusion completion (step S73).

FIG. 19 is a flowchart showing the process of the exclusion monitor 38. First, the exclusion monitor 38 checks whether there is exclusion information, exclusion holding time of which is equal to or longer than the allowed exclusion-holding time of the operational environment 42, in the secured exclusion 45 (step S81). If there is such exclusion information, the exclusion monitor 38 refers to the file operation 43 and checks whether the file operation from the requester is already performed (step S82). If the file operation from the requester is not performed yet, the exclusion monitor 38 calls up the exclusion release request 33 (step S83) and it repeats the processes in and after step S83. The exclusion release request 33 called up in step S83 performs the process shown in FIG. 17. If the file operation from the requester is already performed, the exclusion monitor 38 repeats the processes in and after step S81 without calling up the exclusion release request 33.

If in step S81 there is no exclusion information, exclusion holding time of which is equal to or longer than the allowed exclusion-holding time, the next starting time of the exclusion monitor 38 is reserved (step S84) and the process is terminated.

Figure 20:
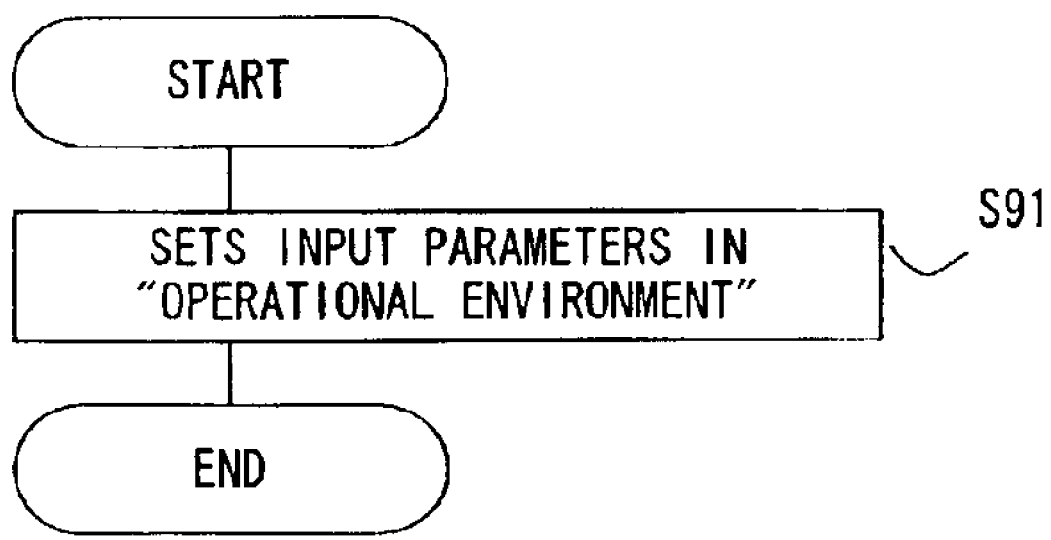
FIG. 20 is a flowchart showing an environmental setting process.

FIG. 20 is a flowchart showing the process of the environmental setting 34. First, the environmental setting 34 sets parameters input by a user in the operational environment 42 (step S91). The set parameters are referred to from time to time in each of the processes described above.

Each of the use systems 11 and 12, and the shared system 13 shown in FIG. 3, can be configured, for example, by the information processing device (computer) shown in FIG. 21.

The information processing device shown in FIG. 21 comprises a CPU (central processing unit) 101, a memory 102, an input device 103, an output device 104, an external storage device 105, a medium driving device 106 and a network connection device 107, which are all connected to one another by a bus 108.

The memory 102 stores programs and data used for the process, and for the memory 102, a ROM (read-only memory), a RAM (random-access memory) and the like are used. The CPU 101 performs necessary processes by using the memory 102 and executing the programs.

The operational environment 42, file operation 43, exclusion waiting 44, secured exclusion 45 and exclusion log 46 which are all shown in FIG. 3, correspond to data stored in the memory 102. The applications 21, 23 and 27, clients 22 and 24, servers 25 and 26, file system 28, request reception 31, exclusion wait request 32, exclusion release request 33, environmental setting 34, waiting estimation 35, waiting monitor 36, waiting securement 37, exclusion monitor 38, exclusion release request 39, exclusion secure request 40 and device access 41 correspond to programs stored in the memory 102.

The input device 103 is used to input instructions and information from an operator (user or shared system manager), and for the input device 103, a keyboard, a pointing device, a touch panel and the like are used. The output device 104 is used to output inquiries and process results to an operator, and for the output device, a display, a printer, a speaker and the like are used.

For the external storage device 105, a magnetic disk device, an optical disk device, a magneto-optical disk device, a tape device and the like are used. The information processing device stores in advance the programs and data described above in this external storage device 105, and uses the programs and data by loading them onto the memory 102, if requested. The file resources 47 shown in FIG. 3 are also stored in the external storage device 105.

The medium driving device 106 drives a portable storage medium 109 and accesses its recorded content. For the portable storage medium 109, an arbitrary computer-readable storage medium, such as a memory card, a flexible disk, a CD-ROM (compact-disk read-only memory), an optical disk, a magneto-optical disk, etc., is used. The operator stores in advance the programs and data in such a portable storage medium 109, and uses the programs and data by loading them onto the memory 102, if requested.

The network connection device 107 is connected to an arbitrary communication network, such as a LAN, the Internet, etc., and it performs data conversion accompanying communications. The information processing device receives the programs and data from an external device through the network connection device 107, and uses the programs and data by loading them onto the memory 102, if requested.

FIG. 22 shows computer-readable storage media providing the information processing device shown in FIG. 21 with the programs and data. The programs and data that are both stored in the portable storage medium 109 or the database 111 of a server 110, are loaded onto the memory 102. In this case, the server 110 generates a propagation signal propagating the programs and data, and transmits the signal to the information processing device through an arbitrary medium in a network. Then, the CPU 101 performs necessary processes by using the data and executing the programs.

According to the present invention, if an application requesting exclusion and an application requesting no exclusion in a use system and a shared system simultaneously use a shared file, exclusion of the shared file can be surely performed. In particular, even if an application requesting no exclusion uses the shared file, exclusion can be automatically performed. Therefore, the destruction of the shared file due to simultaneous data writing can be prevented.

What is claimed is:

1. A file control device connected to a network for handling access requests for a file resources, said network having a first access source requesting exclusion of a file resource and a second access source requesting no exclusion of said file resource, for handling access requests for said file resource, the file control device composing:
   an interface device receiving an access request from the first access source and an access request from the second access source through the network;
   a request reception device accepting the access request from the first access source, the access request from the second access source and an access request from a third access source in the file control device;
   a control device performing exclusive control over the file resource among the access requests from the first, second, and third access sources in response to the access request from the second access source; wherein
   said first access source corresponds to an application requesting exclusion in a use system,
   said second access source corresponds to an application requesting no exclusion in the same or a different use system,
   said third access source corresponds to an application requesting exclusion or an application requesting no exclusion in a shared system, and
   said file control device realizes a shared file in said network by processing the respective access requests from these access sources.

2. The file control device according to claim 1, further comprising
   a device registering an operational environment of exclusive control designated by a user,
   wherein
   said control device performs the exclusive control while referring to the registered operational environment.

3. The file control device according to claim 1, wherein when the access request from the second access source corresponds to a process for which securing exclusion of the file resource is required, said control device performs an exclusion wait request process for the file resource.

4. The file control device according to claim 1, wherein when the access request from the second access source corresponds to a process for which exclusion release of the file resource is required, said control device performs an exclusion release request process for the file resource.

5. The file control device according to claim 1, wherein when there is no access request from the second access source for a specific time period after exclusion of the file resource is secured in response to the access request from the second access source, said control device compulsorily releases the exclusion of the file resource.

6. A computer-readable storage medium on which is recorded a program enabling a computer connected to a network for handling access requests for a file resource, said network having a first access source requesting exclusion of said file resource and a second access source requesting no exclusion of said file resource, to perform a process, the process comprising:
   receiving an access request from the first access source and an access request from the second access source through the network;
   accepting the access request from the first access source, the access request from the second access source and an access request from a third access source in the file control device;
   registering the accepted access requests; and
   performing exclusive control over the file resource between the access requests from the first, second and third access sources in response to the access request from the second access source; wherein
   said first access source corresponds to an application requesting exclusion in a use system,
   said second access source corresponds to an application requesting no exclusion in the same or a different use system,
   said third access source corresponds to an application requesting exclusion or an application requesting no exclusion in a shared system, and
   said process realizes a shared filed in said network by processing the respective access requests from these access sources.

7. A propagation signal for propagating a program enabling a computer connected to a network for handling access requests for a file resource, said network having a first access source requesting exclusion of said file resource and a second access source requesting no exclusion of said file resource, the process comprising:
   receiving an access request from the first access source and an access request from the second access source through the network;
   accepting the access request from the first access source, the access request from the second access source and an access request from a third access source in the file control device;
   registering the accepted access requests; and
   performing exclusive control over the file resource between the access requests from the first, second and third access sources in response to the access request from the second access source; wherein
   said first access source corresponds to an application requesting exclusion in a use system,
   said second access source corresponds to an application requesting no exclusion in the same or a different use system,
   said third access source corresponds to an application requesting exclusion or an application requesting no exclusion in a shared system, and
   said process realizes a shared file in said network by processing the respective access requests from these access sources.

8. A file control method used in a shared system connected to a network for handling access requests for a file resource, said network having a first access source requesting exclusion of said file resource and a second access source requesting no exclusion of said file resource, the file control method comprising:
   receiving an access request from the first access source and an access request from the second access source through the network;
   accepting the access request from the first access source, the access request from the second access source and an access request from a third access source in the file control device;

registering the accepted access requests; and performing exclusive control over the file resource between the access requests from the first, second and third access sources in response to the access request from the second access source; wherein said first access source corresponds to an application requesting exclusion in a use system, said second access source corresponds to an application requesting no exclusion in the same or a different use system, said third access source corresponds to an application requesting exclusion or an application requesting no exclusion in a shared system, and said method realizes a shared file in said network by processing the respective access requests from these access sources.

9. A file control device connected to a network for handling access requests for a file resource, said network having a first access source requesting exclusion of said file resource and a second access source requesting no exclusion of said file resource, the file control device comprising:

interface means for receiving an access request from the first access source and an access request from the second access source through the network;

request reception means accepting the access request from the first access source, the access request from the second access source and an access request from a third access source in the file control device;

registration means for registering the accepted access requests; and control means for performing exclusive control over the file resource between the access requests from the first, second and third access sources in response to the access request from the second access source; wherein said first access source corresponds to an application requesting exclusion in a use system, said second access source corresponds to an application requesting no exclusion in the same or a different use system, said third access source corresponds to an application requesting exclusion or an application requesting no exclusion in a shared system, and said file control device realizes a shared filed in said network by processing the processing the respective access requests from these access sources.

* * * * *

UNITED STATES PATENT AND TRADEMARK OFFICE
CERTIFICATE OF CORRECTION

PATENT NO. : 6,952,755 B2  Page 1 of 1
APPLICATION NO. : 10/271717
DATED : October 4, 2005
INVENTOR(S) : Fumiyoshi Karube It is certified that error appears in the above-identified patent and that said Letters Patent is hereby corrected as shown below:

Column 13, line 12, change "composing:" to --comprising:--; and
line 37, after "comprising" insert --:--.

Column 16, line 22, delete "processing the" (second occurrence).

Signed and Sealed this

Twenty-eighth Day of November, 2006

JON W. DUDAS
*Director of the United States Patent and Trademark Office*